United States Patent [19]

Fearnside

[11] 4,306,252
[45] Dec. 15, 1981

[54] OPTICAL SCANNING METHOD AND APPARATUS

[75] Inventor: William T. Fearnside, Victor, N.Y.

[73] Assignee: Eastman Kodak Company, Rochester, N.Y.

[21] Appl. No.: 170,487

[22] Filed: Jul. 21, 1980

[51] Int. Cl.³ .............................................. H04N 3/08
[52] U.S. Cl. .............................. 358/206; 358/208; 358/213; 358/293
[58] Field of Search ............... 358/293, 206, 208, 212, 358/213, 214, 215

[56] References Cited

U.S. PATENT DOCUMENTS

| | | |
|---|---|---|
| 2,590,281 | 3/1952 | Sziklai . |
| 2,976,357 | 3/1961 | Hammett . |
| 3,410,954 | 11/1968 | Erde . |
| 3,816,655 | 6/1974 | Favreau . |
| 4,148,071 | 4/1979 | Zinchuck . |
| 4,245,240 | 1/1981 | Tanaka ........................ 358/208 |

OTHER PUBLICATIONS

"An Experimental Telecine Using a Line Array CCD Sensor", Childs et al., SMPTE Journal, vol. 87, No. 4 Apr. 1978, pp. 209–213.

*Primary Examiner*—Richard Murray
*Attorney, Agent, or Firm*—Thomas H. Close

[57] ABSTRACT

Optical scanning method and apparatus suitable for use with a video player for scanning an information bearing medium to produce a standard television signal is disclosed. The scanning apparatus includes a movable mirror that deflects an optical path to effect a scan. The mirror is angularly displaced, back and forth, between first and second positions at a substantially constant rate in a "back-to-back sawtooth" fashion, such that one scan is made as the mirror is moved from the first position to the second position, and the next scan is made as the mirror is returned from its second position to its first position. The scanning apparatus inverts an image transmitted along the optical path between each successive scan to provide scanning in a "sawtooth" fashion, e.g. scanning an image from top to bottom—quickly retracing to the top of the image—and repeating the scanning process from top to bottom, as is required in the standard television scanning format.

8 Claims, 4 Drawing Figures

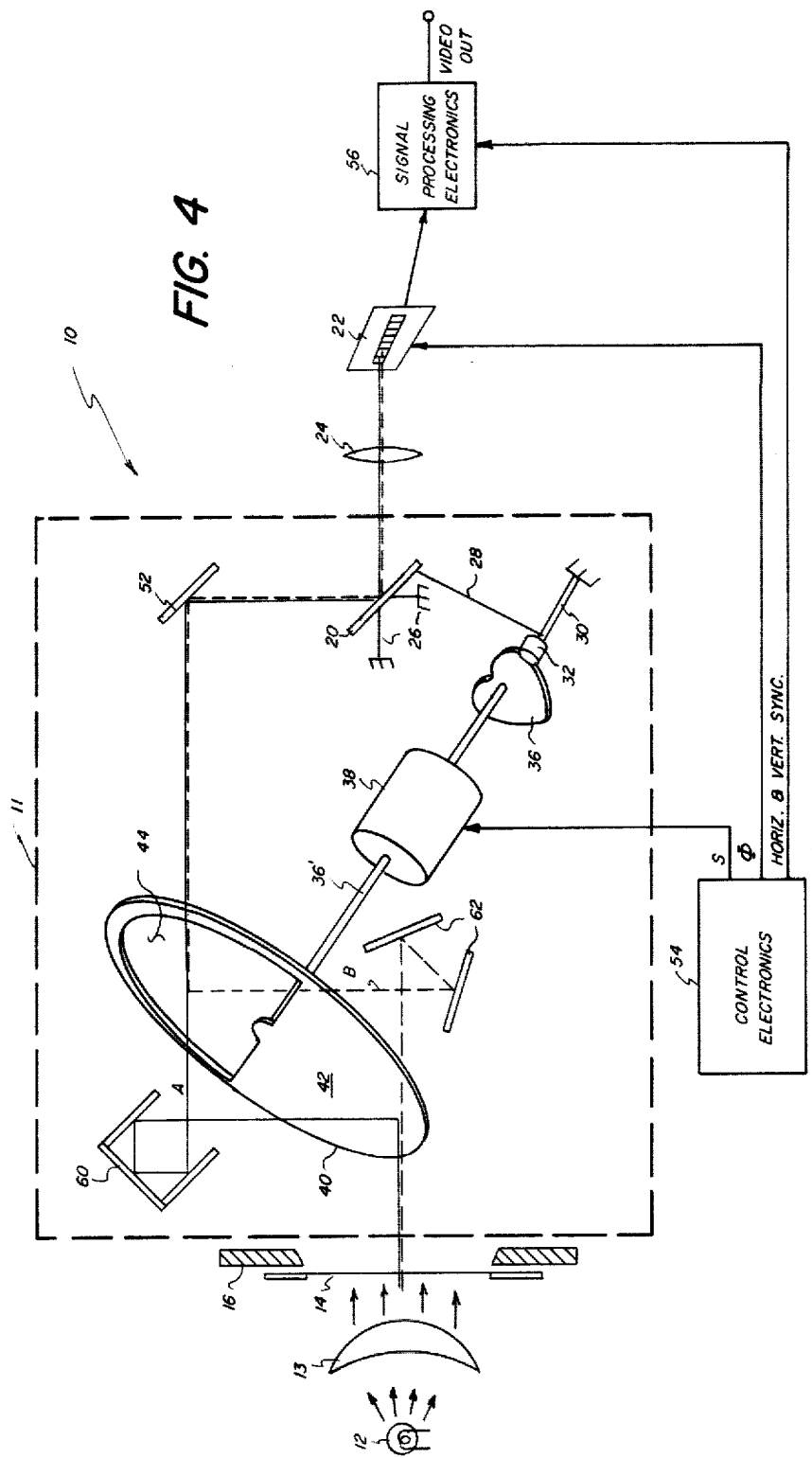

OPTICAL SCANNING METHOD AND APPARATUS

BACKGROUND OF THE INVENTION

1. Field of the Invention

This invention relates to optical scanning and more particularly to such scanning effected by mirrors.

2. Discussion Related to the Problem

Optical scanning apparatus such as that used in a video player for scanning still pictures (e.g. photographic prints or slides) to produce a television signal, is well known. In a video player a picture is scanned in a horizontal direction at a standard television line rate, and the line scan is displaced in a vertical direction at the standard television field rate. In the NTSC standard television signal format, the picture is scanned from top to bottom 60 times per second. Approximately 1 millisecond is available between successive scans for retracing from the bottom of the picture back to the top. Typical prior art optical scanners employ a CRT to effect the horizontal and vertical scans. Achieving vertical retrace in less than 1 millisecond in such so-called "flying-spot" scanners is no problem.

Recent developments in solid-state line sensing arrays make them particularly attractive from cost, size and energy consumption standpoints, for use as an alternative to a CRT in a video player. A solid-state line sensing array can easily scan an image in the horizontal direction, and it remains to provide the required periodic vertical displacement of the horizontal scan with respect to the scanned image. The use of a pivoting mirror to periodically deflect an optical path in a scanner is well known in the art (see U.S. Pat. No. 2,590,281, issued Mar. 25, 1952 to G. C. Sziklai et al). In the standard NTSC television signal format, the vertical scan of the image takes about 16 milliseconds and as stated above, about 1 millisecond is allowed for retracing between vertical scans. To accomplish such a scan with a mirror, the mirror would be moved smoothly through some angular displacement in about 16 milliseconds then quickly returned to the initial starting position in about 1 millisecond. A plot of the mirror angular position versus time would resemble a "sawtooth" waveform. Unfortunately, because of the inertia of the mirror, practical pivoting mirror systems having inadequate high frequency performance to accomplish the vertical retrace in the approximately 1 millisecond time period available. One possible solution to this problem is to employ two pivoting mirrors, the angular displacement of each, versus time, resembling "back-to-back sawtooth" waveforms, which are 180° out of phase. Scanning apparatus employing two mirrors shifts the optical path back and forth from one mirror to the other so that while one mirror is scanning a picture from top to bottom, the other mirror is pivoting back to its starting position (see U.S. Pat. No. 2,590,281 above). This arrangement greatly relaxes the high frequency response required of the mirror pivoting system, however, the complexity of two mirrors increases the expense of the apparatus and leads to added complication in aligning and matching the response characteristics of the two pivoting mirrors. Another way to accomplish the quick retrace in a mirror scan system is to employ a rotating optical polygon as the deflecting element (see U.S. Pat. No. 4,148,071 issued Apr. 3, 1979 to Zinchuk). Unfortunately, optical polygons in themselves are relatively expensive optical elements.

The problem faced by the inventor, therefore, was to provide a scanning method and apparatus employing a pivoting mirror for deflecting an optical path, that (a) quickly retraced between successive vertical scans and (b) avoided the complexity and expense of prior art multiple mirror and rotating polygon solutions.

SOLUTION—SUMMARY OF THE INVENTION

The scanning method and apparatus according to the present invention solves the problems noted above by including a movable mirror that deflects an optical path to effect a scan. The mirror is angularly displaced, back and forth, between first and second positions at a substantially constant rate in a "back-to-back sawtooth" fashion, thereby relaxing the high frequency performance requirements of the scanning mirror. To provide "sawtooth" type scanning with quick retrace, an image transmitted along the optical path is periodically inverted in the direction of scanning. Means are provided for synchronizing the motion of the scanning mirror with the inversion of the image so that the image is repetitively scanned in a sawtooth fashion. In a preferred embodiment of the apparatus, two alternative optical paths to the scanning mirror are provided. The first alternative optical path to the scanning mirror includes an even number of reflections in the plane of scanning, and the second alternative optical path includes an odd number of reflections in the plane of scanning. In this way the image transmitted along the first path is inverted in the scanning direction with respect to the image transmitted along the second path. A light valve activates the first alternative optical path when the scanning mirror is scanning in one direction, and activates the second alternative optical path when the scanning mirror is scanning in the other direction, thereby providing sawtooth type scanning with quick retrace. The scanning apparatus according to the present invention is combined with a self-scanning linear image sensing array and an image projector to provide a video player. The linear image sensing array scans the image line-by-line in a horizontal direction, and the scanning apparatus according to the present invention displaces the line scan with respect to the image in the vertical direction.

DESCRIPTION OF THE DRAWINGS

The invention will be described with reference to the drawings, wherein:

FIG. 4 is a schematic diagram of an alternative embodiment of a scanning apparatus according to the present invention.

DESCRIPTION OF THE PREFERRED EMBODIMENTS

Figure 1:
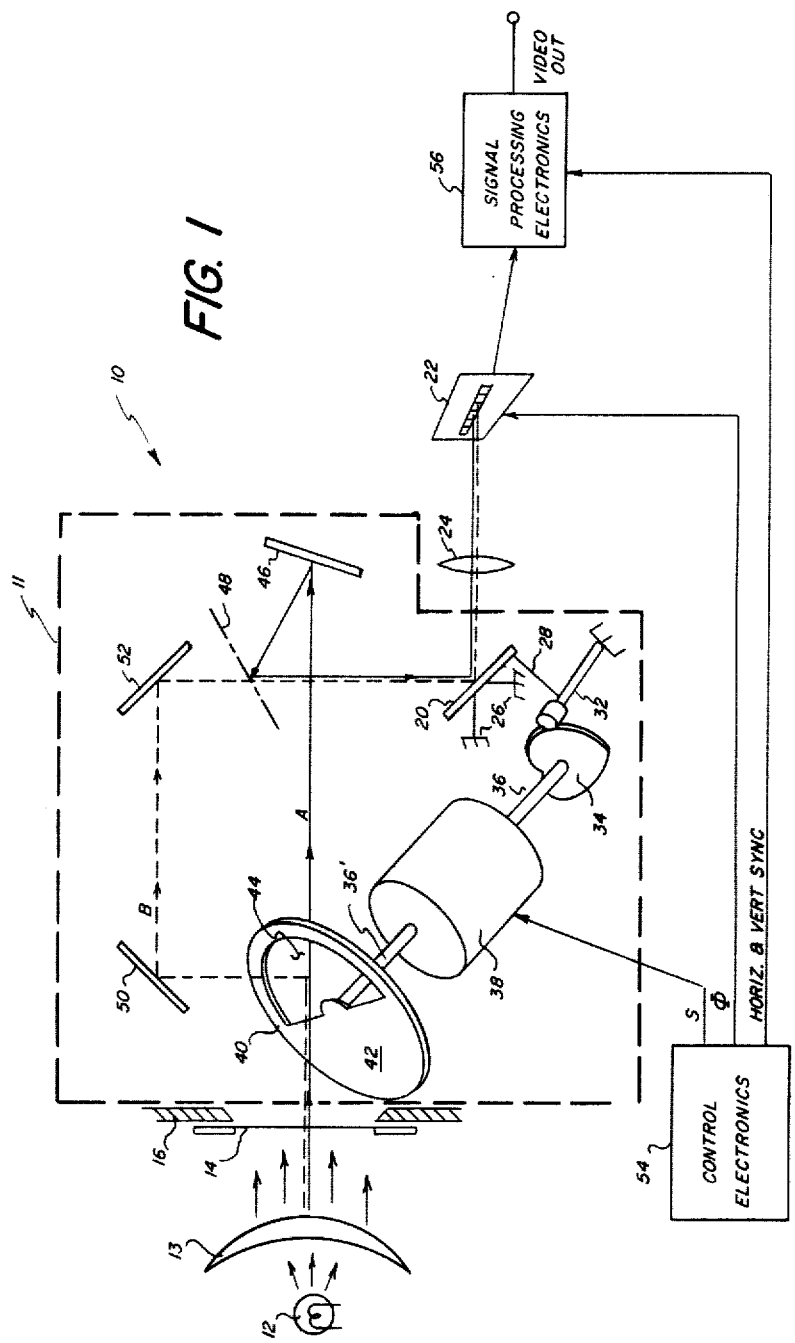
FIG. 1 is an overall schematic diagram of a video player including scanning apparatus according to the present invention.
Figure 2:
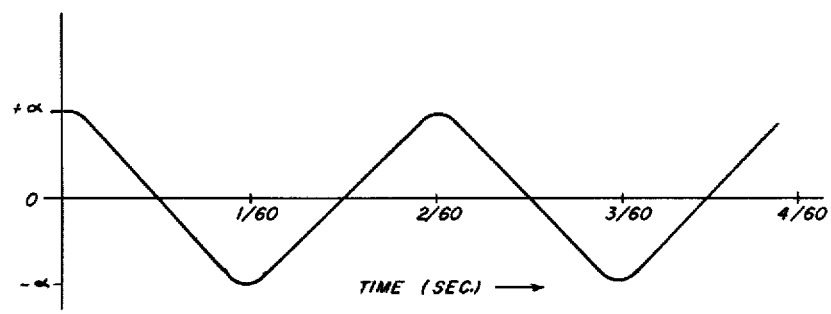
FIG. 2 is a waveform diagram of the angular position of the scanning mirror with respect to time and illustrates the "back-to-back sawtooth" motion of the scanning mirror according to the present invention.

A video player, generally designated 10, including optical scanning apparatus 11, according to a preferred embodiment of the present invention, is shown schematically in FIG. 1. The video player includes a light source 12 and a condensing lens 13 for illuminating an information bearing medium (e.g. a slide) 14 in a film gate 16. Light from the film gate is transmitted along either one of two optical paths, labelled A and B, to a scanning mirror 20. Light reflected by the scanning mirror 20 is imaged on a solid-state linear image sensing array (such as a charge coupled device image sensor) 22 by a scan lens 24. Scanning mirror 20 is pivotally mounted on a flexure hinge 26 and is connected by a link 28 to a cantilever spring 30. The distal end of cantilever spring 30 carries a cam follower 32, that is biased into contact with a cordiform cam 34 by cantilever spring 30. Cam 34 is attached to a shaft 36 that is driven by a synchronous motor 38. As shown in FIG. 2, each revolution of cordiform cam 34 causes mirror 20 to be rotated about a virtual pivot defined by the flexure hinge 26, via cam follower 32 and linkage 28, in a "back-to-back sawtooth" fashion through an angular displacement $2\alpha$. As described thus far, each revolution of cam 34 would cause mirror 20 to scan the projected image of slide 14 from top to bottom, then from bottom to top. This, of course, is not the desired scanning sequence, since the standard TV signal is generated by repeatedly scanning an image, line by line, from top to bottom—quickly retracing to the top of the image between successive scans—and repeating the scan from top to bottom. The "back-to-back sawtooth" scanning sequence shown in FIG. 2 is converted, according to the present invention, into the desired "sawtooth" scanning sequence by alternately switching between the two optical paths A and B. One optical path has an odd number of reflections, and the other has an even number of reflections in the scanning plane to cause an inversion of the image from top to bottom between successive scans.

Figure 3:
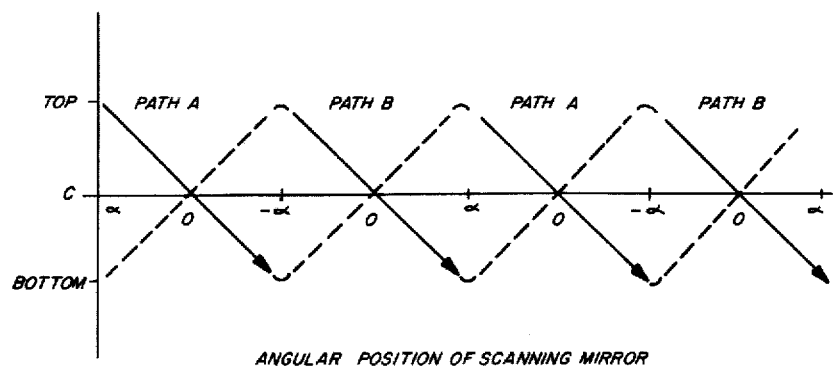
FIG. 3 is a waveform diagram of the vertical position of the projected image with respect to the line imager for optical paths A and B in the scanning apparatus shown in FIG. 1 and illustrates the "sawtooth" scanning achieved by the present invention.

Light is switched from one optical path to the other by a light valve comprising a rotating disc 40 (see FIG. 1) having a reflecting portion 42 and a transmitting portion (e.g. a cut-out portion) 44. When the transmitting portion of disc 40 is disposed in the optical path of the scanner (as shown in FIG. 1), light from gate 16, following optical path A, is reflected first from a mirror 46 and then from a beam splitter 48 prior to reaching scanning mirror 20. When the reflecting portion of disc 40 is disposed in the optical path of the scanning apparatus, light from film gate 16, following optical path B is first reflected from the disc 40, then from a mirror 50, then from a mirror 52, and finally through beam splitter 48 before reaching scanning mirror 20. Because path A has an even number of reflections (i.e. 2) prior to mirror 20, and path B has an odd number of reflections (i.e. 3), the image transmitted via path A will appear inverted top to bottom with respect to the image transmitted via path B. The relative vertical positions of the film image on the line imager for paths A and B, as a function of the changing angular position of scanning mirror 20 with time, are shown in FIG. 3. The light valve is employed to switch back and forth between paths A and B at the appropriate times to obtain a "sawtooth" type scan as shown by solid lines in FIG. 3. Starting at time zero, the scanning apparatus 11 scans from the top of the bottom of the film image, employing optical path A. At time 1/60, the light valve switches from optical path A to optical path B and the image of the film in the gate is once again scanned from top to bottom. Rotating disc 40 is mechanically coupled, via an extension 36' of shaft 36 to the mirror driving cam 34 to synchronize the switching between optical paths A and B with the angular excursions of mirror 20. Of course, synchronization could also be achieved by other means, for example, by the use of an electronic servo system.

The video player 10 generates a standard television signal, line by line, by clocking the solid-state line sensing array 22 in a known manner with polyphase clock signals $\Phi$. The clock signals $\Phi$, and horizontal and vertical synchronization signals for composing a standard composite video signal, are generated by a control electronics and clock generator circuit 54 in a known manner. The output of the solid-state line sensor 22, along with the horizontal and vertical synchronization signals produced by control electronics 54 are supplied as inputs to signal processing electronics 56, which produce a standard composite video signal from the inputs in a known manner.

The angular velocity of synchronous motor 38 is determined by a control signal S supplied from control electronics 54 to provide the proper number of vertical scans per second. For example, in the NTSC standard television signal, 60 fields per second are scanned. Since the scanning apparatus 11 scans two fields per revolution of cordiform cam 34, the motor is driven at 1800 RPM to produce the NTSC compatible television signal. The position of motor 38 is synchronized with the vertical sync signals supplied to the signal processing electronics 56 by control electronics 54.

An alternative embodiment of scanning apparatus according to the present invention, and likewise employed in a video player, is shown in FIG. 4, where elements similar to those of the scanner shown in FIG. 1 are similarly numbered. In the embodiment shown in FIG. 4, both sides of the reflective portion 43 of disc 40 are reflective, and the disc is disposed to intercept the optical path from the slide gate 16 to the mirror 20 in two places, thereby eliminating the need for a beam splitter such as was used in the apparatus shown in FIG. 1. In the position shown in FIG. 4, optical path A is active. Light from film gate 16 reflects from the reflecting portion 42 of disc 40—reflects through an arrangement 60 of three mirrors placed 90° with respect to each other to deflect the beam through an angle of 270° via three reflections—passes through the transparent portion 44 of disc 40 and then reflects from mirror 52 onto scanning mirror 20. The beam in optical path A undergoes five reflections in the scanning plane prior to reaching scanning mirror 20.

When optical path B is active, as shown by the dotted line in FIG. 4, the light from the film gate 16 passes through the transparent portion 44 of disc 40—reflects through an arrangement 62 of two mirrors placed 45° with respect to each other to deflect the beam through an angle of 270°—reflects from the backside of disc 40—and then reflects from mirror 52 onto scanning mirror 20, for a total of four reflections prior to reaching scanning mirror 20. As can be seen from FIG. 4, the image of the film gate 16 transmitted along optical path B will be inverted from top to bottom with respect to the image transmitted along optical path A. As motor 38 rotates disc 40 and cam 34 simultaneously, optical path A and optical path B are alternatively activated to provide the desired "sawtooth" scan of the film while the scanning mirror 20 is deflected in a "back-to-back sawtooth" manner.

The invention has been described in detail with reference to particular embodiments, however, it is understood that variations and modifications may be made within the spirit and scope of the invention. For example, the present invention is also useful in scanners other than video players, such as laser scanners where a laser beam to be deflected in a "sawtooth" fashion may be controlled by moving a scanning mirror in a "back-to-back" sawtooth fashion.

I claim:

1. Optical scanning apparatus for periodically deflecting the optical path in an optical system, comprising:
    (a) a scanning mirror mounted for pivotal movement between first and second positions to deflect the optical path, thereby effecting a scan;
    (b) means for moving said scanning mirror back and forth between said first and second positions at a substantially constant rate;
    (c) means for periodically inverting an image transmitted along the optical path; and
    (d) means for synchronizing said mirror moving means and said image inverting means so that said image inverting means inverts said image between successive movements of said scanning mirror.

2. The invention claimed in claim 1 wherein:
    said image inverting means includes means for defining (a) a first alternative optical path having an even number of reflections, and (b) a second alternative optical path having an odd number of reflections, and wherein said image inverting means further includes light valve means for alternately activating said first and said second alternative optical paths.

3. The invention claimed in claim 2 wherein:
    said light valve means comprises (a) a disc disposed in the optical path having a reflecting portion and a transmitting portion, and (b) means for rotating said disc such that the reflecting portion, and the transmitting portion are alternately in the optical path, and such that when said reflecting portion is in the optical path one of said alternative optical paths is active and wherein when said transmitting portion is in the optical path, the other of said alternative optical paths is active.

4. The invention claimed in claim 3 wherein:
    said mirror moving means comprises a motor, a cam driven by said motor, a cam follower, and a link connecting said cam follower and said scanning mirror;
    and said synchronizing means comprises a mechanical link between said motor and said disc.

5. A video player, comprising:
    (a) means for projecting an image of an information bearing medium along an optical path;
    (b) a solid-state linear image sensing array;
    (c) a first alternative optical path for conveying said projected image to said array, said first alternative optical path having an even number of reflections;
    (d) a second alternative optical path for conveying said projected image to said array, said second alternative optical path having an odd number of reflections;
    (e) light valve means for periodically switching the projected image between said first and second alternative optical paths;
    (f) scanning mirror means disposed in said optical path and pivotally movable for displacing said projected image relative to said array to effect a scan;
    (g) means for moving said scanning mirror back and forth at a substantially constant rate;
    (h) synchronizing means for synchronizing said light valve means and said mirror moving means such that said first alternative optical path is active when said mirror is moved in one direction, and said second alternative optical path is active when said mirror is moved in the opposite direction.

6. A video player, comprising:
    (a) means for projecting an image of an information bearing medium along an optical path;
    (b) a solid-state linear imager sensing array disposed in said optical path, for scanning said image linewise in a first direction;
    (c) scanning mirror means disposed in said optical path and mounted for pivotal movement between first and second angular positions for deflecting the image relative to said image sensing array in a second direction substantially perpendicular to said first direction;
    (d) means for moving said scanning mirror back and forth between said first and second positions at a substantially constant rate;
    (e) means for periodically inverting the image in the second direction; and
    (f) means for synchronizing said mirror moving means and said image inverting means such that the image is inverted between successive movements of said scanning mirror.

7. A method for effecting sawtooth scanning in optical apparatus employing a moveable mirror to deflect the optical path of the apparatus, comprising the steps of:
    transmitting an image along the optical path;
    pivotally moving the mirror back and forth at a substantially constant rate to scan the image; and
    inverting the image, in the direction of the scan, between each back and forth movement of the mirror.

8. Optical scanning apparatus for periodically deflecting the optical path in an optical system, comprising:
    (a) a scanning mirror mounted for pivotal movement between first and second positions to deflect the optical path, thereby effecting a scan;
    (b) means for moving said scanning mirror back and forth between said first and second positions at a substantially constant rate;
    (c) means for periodically inverting an image transmitted along the optical path, said image inverting means including means for establishing a first light path including at least one reflecting surface, and means for inserting an additional one or other odd number of reflecting surfaces into said first light path to establish a second light path; and
    (d) means for synchronizing said mirror moving means and said image inverting means so that said image inverting means inverts said image between successive movements of said scanning mirror.

* * * * *